US010869255B2

(12) United States Patent
Lekutai

(10) Patent No.: US 10,869,255 B2
(45) Date of Patent: Dec. 15, 2020

(54) TELECOMMUNICATIONS BETWEEN REMOTE TERMINAL AND RELAY TERMINAL

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/015,857

(22) Filed: Jun. 22, 2018

(65) Prior Publication Data
US 2019/0394700 A1    Dec. 26, 2019

(51) Int. Cl.
*H04W 40/20* (2009.01)
*H04W 36/36* (2009.01)
*H04W 40/22* (2009.01)
*H04W 40/14* (2009.01)
*H04W 24/04* (2009.01)
(Continued)

(52) U.S. Cl.
CPC ........... *H04W 40/14* (2013.01); *H04W 24/04* (2013.01); *H04W 36/36* (2013.01); *H04W 40/20* (2013.01); *H04W 40/22* (2013.01); *H04W 84/12* (2013.01); *H04W 88/04* (2013.01)

(58) Field of Classification Search
CPC ..... H04W 40/14; H04W 24/04; H04W 36/36; H04W 40/20; H04W 40/22; H04W 88/04; H04W 84/12; H04W 40/24; H04W 40/246; H04W 40/248; H04W 36/38; H04W 36/34; H04W 36/03; H04W 36/32
See application file for complete search history.

(56) References Cited

U.S. PATENT DOCUMENTS

| 2015/0036579 A1* | 2/2015 | Wu ........................... H04B 7/15 370/312 |
| 2015/0085740 A1* | 3/2015 | Kalapatapu ........... H04W 88/04 370/315 |

(Continued)

OTHER PUBLICATIONS

3GPP TR 22.803 V12.2.0, "3rd Generation Partnership Project; Technical Specification Group Services and System Aspects; Feasibility Study for Proximity Services (ProSe)," Jun. 2013, pp. 1, 10-13, 20, 26, and 27.

(Continued)

*Primary Examiner* — Un C Cho
*Assistant Examiner* — Lalita W Pace
(74) *Attorney, Agent, or Firm* — Lee & Hayes, P.C.

(57) ABSTRACT

A terminal communicatively connectable with a relay terminal can establish a first connection with the relay terminal via a communications interface. The terminal can determine status information associated with at least one of the terminal or the first connection; and transmit, via the communications interface, the status information. In some examples, a relay terminal can receive, from a remote terminal, the status information. The relay terminal can determine that a reliability of the first connection does not satisfy a predetermined criterion based at least in part on the status information and, in response, cause the remote terminal to establish a connection with an additional relay terminal different from the relay terminal. Some examples include a sidelink connection between the remote terminal and the relay terminal.

18 Claims, 8 Drawing Sheets

(51) Int. Cl.
*H04W 84/12* (2009.01)
*H04W 88/04* (2009.01)

(56) References Cited

U.S. PATENT DOCUMENTS

| | | | | |
|---|---|---|---|---|
| 2016/0323777 | A1* | 11/2016 | Pan | H04B 7/2637 |
| 2017/0164332 | A1* | 6/2017 | Kim | H04W 40/246 |
| 2018/0092017 | A1* | 3/2018 | Freda | H04W 76/14 |
| 2018/0139682 | A1* | 5/2018 | Xu | H04W 88/04 |
| 2018/0255505 | A1* | 9/2018 | Thyagarajan | H04W 8/005 |
| 2018/0295556 | A1* | 10/2018 | Baek | H04W 8/20 |
| 2018/0324842 | A1* | 11/2018 | Gulati | H04W 72/1278 |
| 2018/0343598 | A1* | 11/2018 | Xu | H04W 36/08 |
| 2019/0069247 | A1* | 2/2019 | Wu | H04W 76/15 |
| 2019/0110238 | A1* | 4/2019 | Buckley | H04W 8/06 |
| 2020/0067762 | A1* | 2/2020 | Tang | H04W 24/02 |

OTHER PUBLICATIONS

3GPP TR 36.843 V12.0.1, "3rd Generation Partnership Project; Technical Specification Group Radio Access Network; Study on LTE Device to Device Proximity Services; Radio Aspects", Mar. 2014, pp. 1-10, 16, 19-21, 47-49.

ETSI TS 122 468 V14.0.0, Mar. 2017, "LTE; Group Communication System Enablers for LTE (GCSE_LTE)", pp. 1 and 7-20.

ETSI TS 123 303 V14.1.0, May 2017, "Universal Mobile Telecommunications System (UMTS); LTE; Proximity-based Services (ProSe); Stage 2", pp. 1, 3-5, 8, 12-30, 36-40, 109-121.

Flore, D., "Initial Cellular V2X Standard Completed", 3GPP, Sep. 26, 2016, 3 pages.

Jung, S.H., et al., "A New Way of Extending Network Coverage: Relay-assisted D2D Communications in 3GPP", Aug. 20, 2016, ScienceDirect, pp. 117-121.

"LTE Drive Test", RCR Wireless News, May 9, 2014, 2 pages.

Papathanassiou, et al., "Cellular V2X as the Essential Enabler of Superior Global Connected Transportation Services", V1, No. 2, Jun. 2017, 5 pages.

PV, Latha et al., "Device to Device Communication in LTE", retrieved May 18, 2018 from «https://www.sasken.com/sites/default/files/Sasken_Whitepaper_Device_to_Device_LTE_Communication_pdf», Jun. 14, 2016, 15 pages.

* cited by examiner

TELECOMMUNICATIONS BETWEEN REMOTE TERMINAL AND RELAY TERMINAL

CROSS-REFERENCE TO RELATED APPLICATIONS

Not applicable.

BACKGROUND

A computing device configured for telecommunications, such as a wireless smartphone or other terminal, is generally capable of communicating via various wireless access networks. Recently, 3GPP has standardized Proximity-based Services (ProSe) that provide direct communication between terminals, referred to as "device to device," or "D2D" communications. ProSe-enabled terminals can communicate directly with each other via a "sidelink" channel, rather than communicating via an eNodeB. In some examples, sidelinks use unlicensed spectrum. Some ProSe terminals can serve as ProSe UE-to-Network relays (for brevity, "relay terminals" or "RTs"). A relay terminal can relay traffic between an eNodeB and a terminal that is out of radio range of the eNodeB but within D2D range of the relay terminal.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The attached drawings are for purposes of illustration and are not necessarily to scale. For brevity of illustration, in the diagrams herein, an arrow beginning with a diamond connects a first component or block (at the diamond end) to at least one second component or block that is or can be included in the first component or block.

DETAILED DESCRIPTION

Overview

Figure 1:
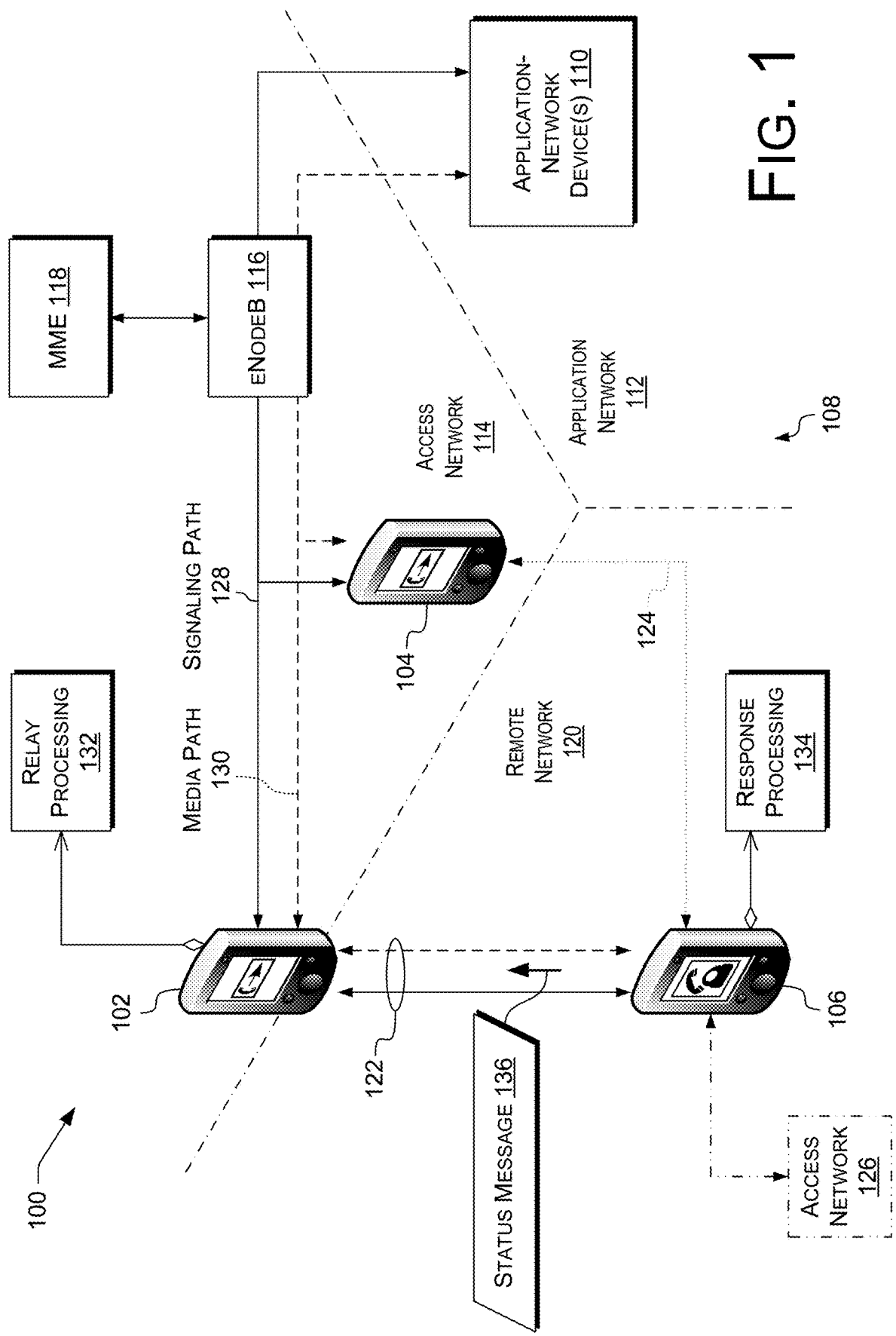
FIG. 1 is a block diagram illustrating a telecommunication system according to some implementations.

Systems and techniques described herein permit more efficiently allocating network resources to terminals or service areas. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks may be operated by one or more service providers ("carriers"), such as one or more cellular-telephony providers. Carriers may operate application networks (or "upper-level" networks) that provide services to terminals, such as telephony or Internet access. The application network(s) are connected via access networks to terminals. Terminals can be operated by users ("subscribers"), or can be autonomous. Example access networks carrying traffic of sessions can include second-generation (2G), third-generation (3G), or fourth-generation (4G) cellular networks, or wireless data networks such as Institute of Electrical and Electronics Engineers (IEEE) No. 802.11 (WIFI) networks carrying voice over Internet Protocol (VoIP) calls. Some examples relate to Long Term Evolution (LTE) cellular networks carrying Voice over LTE (VoLTE) sessions using Session Initiation Protocol (SIP) signaling.

The 3GPP Release No. 13 standards, e.g., 3GPP TS No. 23.303 v14.1.0, define ProSe and D2D communications as part of the access network. For brevity and clarity, D2D connectivity provided by a relay terminal is referred to herein as a "remote network." A relay terminal provides a wireless remote network via which other terminals ("remote terminals") can communicate with an access network and application network(s) connected to that access network. A relay terminal may communicate with one or more access network(s) at any given time, and a remote terminal may communicate with zero or more access network(s) and zero or more remote network(s) at any given time. In some examples, a relay terminal provides a remote network having a coverage area that extends beyond the reach of an access network to which the relay terminal is connected.

ProSe permits subscribers to establish sessions in areas where they do not have cellular coverage via a remote network provided by an RT. However, an RT may be simply a subscriber's terminal, performing as an RT (with the subscriber's permission) in addition to providing subscriber-facing functions. Such RTs may move, roam, handover between access networks, or otherwise change position or network connectivity over time. Therefore, it is difficult to determine the effective network coverage area of a combination of access network(s) and remote network(s). This difficulty may result in under- or over-provisioning or -allocating network resources for particular locations or zones, which may increase network congestion or decrease availability.

Various examples herein measure effective network coverage area in the presence of device-to-device communications. In some examples, terminals exchange location, signal strength, or other information via sidelinks, and report that information to the network. This provides the network with a more effective, more accurate view of network coverage. Some examples provide a real-time or near-real-time view of network coverage as it changes due to RT location or connectivity changes. More accurate coverage information in turn permits more effectively allocating network resources, building out the network, or removing coverage gaps/holes. This can improve network coverage and reduce network congestion.

Some example processes are disclosed herein for implementation on a terminal to control handover between remote networks or to report status information relating to a remote network. Also disclosed herein are systems and devices comprising one or more processors and one or more memories, as well as non-transitory computer-readable media (CRM) storing computer-executable instructions that, when executed, by one or more processors perform various acts and/or processes disclosed herein.

Illustrative Examples

FIG. 1 is a block diagram illustrating a telecommunication system 100 according to some examples. The system includes one or more terminals, shown as terminals 102, 104, and 106 (individually or collectively referred to with reference 102). Functions described with reference to terminal 102 can additionally or alternatively be performed by terminal 104 or 106, unless otherwise specified in this document. Techniques described herein are not limited to either the calling or the called side of a session, but can be used with either or both. Terminals 102, e.g., cellular handheld or in-vehicle user equipment, Internet of Things (IoT) devices, or other computing devices, are communicatively connectable with or via a telecommunications network 108.

Terminals 102 and 104 are communicatively connected to one or more application-network device(s) 110 of application network 112, e.g., via access network 114. In various embodiments, the application-network devices 110 can represent components of an IMS network. The application-network device(s) 110 can include, e.g., one or more ASes, such as an RCS Messaging Server (RMS) or a telephony application server (TAS).

Access network 114 can include or represent, e.g., one or more LTE access networks, WIFI networks, or access networks of other types described herein. For example, access network 114 can include an eNodeB 116 that communicates wirelessly with terminals 102, 104. Access network 114 can additionally or alternatively include an MME 118 that communicates via eNodeB 116 with terminals 102, 104. System 100 can include or be connected with any number of access networks 114 or any number of application networks 112.

Terminal 102 can be configured to initiate or receive a communication session or data thereof, such as a voice call, a video call, a text message, or another asynchronous or synchronous network communication. Initiation of such communications may involve communication clients and Session Initiation Protocol (SIP, RFC No. 3261) clients communicatively connected with components of the telecommunications network, e.g., application-network devices 110.

In the illustrated example, terminal 102 is a relay terminal that defines at least a portion of at least one remote network 120. Terminal 106 is a remote terminal within D2D range of relay terminal 102 and is communicatively connected with relay terminal 102 via sidelink 122. This is an example of a "partial-network D2D" or "partial D2D" configuration, in which one terminal communicating via sidelink 122 (here, relay terminal 102) is within the coverage of (e.g., within radio range of) access network 114, and the other terminal (here, remote terminal 106) is outside the coverage of access network 114. Additionally or alternatively, remote terminal 106 can be connected with relay terminal 104 via sidelink 124, shown as a dotted line. In some examples, a relay terminal 102 can support concurrent sidelink connections with multiple remote terminals 106, but each remote terminal 106 can only support a single sidelink connection at a time.

In some examples, application-network device 110 can receive location information, via relay terminal 102, of remote terminal(s) 106 as they connect to remote network 120. This can provide a real-time coverage map of remote network 120, or of the overall coverage area of access network 114 together with the remote networks 120 that it supports (e.g., D2D sidelink networks, WIFI or BLUETOOTH networks, or other remote networks 120).

Other examples operate in "in-network" or "in-coverage" D2D" configurations, in which remote terminal 106 is also within the coverage of access network 114. For example, a remote terminal 106 within the coverage of access network 114 may still communicate with relay terminal 102 via sidelink 122. This can permit more effectively using network resources or expanding the number of concurrent sessions supported by the network, e.g., in configurations in which eNodeB uplink (UL)/downlink (DL) channels are in a different band than sidelink channels. This configuration is referred to as in-network single-cell D2D. In still other examples, remote terminal 106 can be within the coverage of a second access network 126 (shown in phantom) different from access network 114. This is referred to as in-network multi-cell D2D. For example, access networks 114 and 126 can be part of respective, different PLMNs.

Some ProSe standards for D2D communications between handsets provide a relatively low-rate sidelink/relay (e.g., two resource blocks). Such standards support, e.g., text or low-rate data exchanges via sidelink 122. Some vehicle-to-anything (V2X) standards, by contrast, provide a relatively high-rate sidelink/relay, e.g., sufficient to support VoLTE sessions via sidelink 122.

In some examples of in-network low-rate D2D, IoT devices that transmit low-rate data can do so via sidelinks 122 with relay terminals 102 that are nearby. This permits the IoT device to communicate using a lower-power radio, since the IoT device does not need sufficient power to be able to reach the eNodeB 116. This also permits the IoT device to communicate without occupying network resources in the channels to and from eNodeB 116, which increases network capacity.

Terminals 102 can communicate at least three types of information: registration information, signaling information, and media information. In the illustrated example, registration information and signaling information are carried via signaling path 128. Signaling path 128 can additionally carry, e.g., presence information, position information, or location information. Media information is carried via media path 130, depicted for clarity using dashed lines. The illustrated paths can represent different packet flows along a common network, along different networks, or any combination thereof.

Registration information can include information useful for establishing that a terminal 102 is eligible to receive service, e.g., SIP REGISTER or SUBSCRIBE requests, or No. 802.1X, RADIUS, or Diameter authentication-protocol messages. Signaling information can include information relating to call setup and teardown, e.g., SIP INVITE or BYE requests, or SIP No. 100 Trying, No. 180 Ringing, No. 183 Session Progress, or No. 200 OK responses. Media information can include audio, video, or other user-specified or user-accessible data of a communication session, e.g., carried via the Real-time Transport Protocol (RTP) and encoded using a selected codec. Nonlimiting example codecs can include an adaptive multi-rate (AMR) or International Telecommunications Union (ITU) G. No. 711 audio codec, or an ITU H. No. 263 or Moving Picture Experts Group (MPEG) MPEG-4 video or audiovisual codec. Asynchronous communications such as text messages can be carried as signaling information, e.g., a SIP MESSAGE request, or as media information, e.g., via the Short Message Peer-to-Peer (SMPP) protocol.

Various use cases for mobile communications involve a position of a terminal 102, e.g., a remote terminal 106. For example, emergency services such as "9-1-1" in the US and "1-1-2" in Europe can use the position of terminal 102 to route emergency calls to the appropriate Public Safety Answering Point (PSAP) or to direct first responders to the terminal 102. Search services can use the position of terminal 102 to limit the spatial range of results returned for queries such as "nearby restaurants" or "Mike Oldfield tour stops," e.g., to results within a predetermined distance of the terminal 102. Mapping services can show the position of terminal 102 on a map or provide turn-by-turn directions.

As used herein, the "position" of a terminal 102 is the physical position of the terminal 102, e.g., expressible using latitude and longitude. All positioning techniques have specific precision and accuracy, so the "position" of a device, as used herein, refers to a spatial area within which the terminal 102 is determined to be present, e.g., 42° N, 42° E±15 m for an example position determined using the Global Positioning System (GPS). "Position information" is a representation of position, e.g., decimal or hour-minute-second degrees designating a region in which the terminal 102 is determined to be present. Position information can represent, e.g., the centroid, corner(s), or other features of that region (i.e., the device's position as defined herein). Position information can additionally or alternatively include street addresses, building numbers, or other non-coordinate indications of a position of terminal 102.

As used herein, "location information" is any information used or useful in determining the position of terminal 102. Location information can include position information. For example, terminal 102 can determine its position via GPS, and provide coordinates of the determined position as or in location information, e.g., included in a SIP REGISTER request. Additionally or alternatively, location information can include information that is not position information, but that can be used in determining or estimating position. For example, location information can include an EUTRAN Cell Global Identification (ECGI) of an eNodeB to which terminal 102 is, or has recently been, connected. Since an eNodeB has a limited spatial range, an ECGI indicates an area (eNodeB coverage area) in which the terminal 102 is (or recently was) positioned. Location information can additionally or alternatively include Location Area Identification (LAI) or EUTRAN Cell Identity (ECI) values. LAI values can include an MCC, an MNC, and a Location Area Code (LAC).

In some examples, relay terminal 102 is configured to perform relay processing 132 or remote terminal 106 is configured to perform response processing 134. Relay processing 132 can include transmitting a message to remote terminal 106 to request information from remote terminal 106. Response processing 134 can include transmitting a status message 136 from remote terminal 106 to relay terminal 102 including the requested information, or other information. Examples are discussed herein, e.g., with reference to FIGS. 2-7. Remote terminal 106 can transmit status message 136, e.g., to relay terminal 102 via sidelink 122; to relay terminal 104 via sidelink 124; to eNodeB 116 via access network 114; or to an eNodeB or other device of access network 126. Response processing 134 can include transmitting the status message 136, e.g., in response to a query from relay terminal 102, at predetermined times, or in response to events other than a query from relay terminal 102.

In some examples, relay processing 132 can include requesting, response processing 134 can include sending, or status message 136 can include (or include a representation of), information of at least one of the following types: position information; location information; speed information; velocity information; time; signal strength(s) in one or more band(s); frequency allocation(s); sidelink channel(s) in use; identification information of remote terminal 106; identification information of an access network or access-network operator, e.g., an MCC/MNC pair, a WIFI access-point (AP) name, or a WIFI AP MAC address; a channel quality indicator (CQI), a Rank Indicator (RI); a precoding matrix indicator (PMI); or other information. Additionally or alternatively, relay processing 132 can include requesting, response processing 134 can include sending, or status message 136 can include (or include a representation of), historical data of information of any of the above-noted types, e.g., data of position or velocity over time. Some examples of types of information are described herein with reference to status information 208. In some examples, response processing 134 can include recording information of at least one of the above-noted types at a time when remote terminal 106 is out of coverage of access network 114, and sending status message 136 including that information at a later time when remote terminal 106 is within coverage of access network 114, e.g., as discussed herein with reference to FIG. 3.

Additionally or alternatively, relay processing 132 can include triggering a handover of remote terminal 106 to a different remote network, e.g., to a different relay terminal such as relay terminal 104. Examples are discussed herein, e.g., with reference to FIGS. 4-6. Similarly, in some examples, response processing 134 or other processing at remote terminal 106 can include triggering handover to a different remote network, e.g., a different relay terminal. Examples are discussed herein, e.g., with reference to FIG. 7.

Various examples are as follows.

The terminals 102 can be implemented as any suitable mobile terminals configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an IoT device (e.g., a sensor), an in-vehicle (e.g., in-car) computer, a networked digital camera, and/or similar mobile devices. Although this description predominantly describes the terminals 102 as being "mobile" or "wireless," (e.g., configured to be carried and moved around), it is to be appreciated that the terminals 102 can represent various types of communication devices that are generally stationary as well, such as televisions or similar devices (e.g., smart televisions or set-top boxes, STBs), desktop computers, game consoles, set top boxes, and the like. In this sense, the terms "communication device," "wireless device," "wireless communication device," "wireline device," "mobile device," "terminal," "user equipment (UE)," "client device," and "terminal" may be used interchangeably herein to describe any communication or terminal capable of performing techniques described herein with respect to, e.g., terminals 102. For example, some terminals can be capable of communicating via multiple access networks, e.g., WIFI access networks, and can register via one or more of those networks at any particular time.

For brevity, various components of telecommunications network 108 are omitted. For example, a serving call session control function (S-CSCF) of application network 112 can relay communications from a terminal 102 between access network 114 and application-network device 110, e.g., an Application Server (AS).

As used herein, a message "transmitted to" or "transmitted toward" a destination, or similar terms, can be transmitted directly to the destination, or can be transmitted via one or more intermediate network devices to the destination. Similarly, a message "received from" a destination can be received directly from the destination, or can be received via one or more intermediate network devices from the destination. A message passing through one or more intermediate network devices can be modified by those network devices, e.g., by adding or removing framing, or by changing a presentation of at least part of the message, e.g., from a SIP start-line to a SIP header or vice versa.

A cellular access network 114, 126 can provide wide-area wireless coverage using a technology such as GSM or other 2G cellular technologies; the Universal Mobile Telecommunications System (UMTS) or other 3G cellular technologies; or LTE or other 4G cellular technologies. A remote network 120 can provide wireless coverage using LTE or 5G sidelink (D2D) connections. Example cellular-network technologies can include Code Division Multiple Access (CDMA), Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE Radio Access Network (RAN) (GERAN), Universal Terrestrial RAN (UTRAN), or evolved UMTS Terrestrial RAN (E-UTRAN).

Other wireless access networks 114, 126 or remote networks 120 can include data networks using technologies such as IEEE No. 802.1* protocols (e.g., No. 802.11 WIFI or No. 802.15.1 BLUETOOTH), Asynchronous Transfer Mode (ATM), WIMAX, wireless local area network (WLAN), and other network technologies, e.g., configured to transport IP packets. Data networks can carry over-the-top (OTT) sessions encapsulating, e.g., voice or video data in a way transparent to an underlying packet transport. Additionally or alternatively, cellular networks can carry data packets using HSPA, LTE, or other technologies as well as voice traffic. Some cellular networks, e.g., LTE and 5G, carry both data and voice in a packet-switched format. Some LTE networks can interconnect with WIFI access networks to permit IMS-mediated voice-over-WIFI (VoWIFI) calling.

Communications between terminals 102-106 and application-network devices 110 can additionally or alternatively be performed using other technologies, such as Plain Old Telephone Service (POTS) or Public Switched Telephone Network (PSTN) lines, e.g., using Signaling System No. 7 (SS7) signaling; Data Over Cable Service Interface Specification (DOCSIS); digital subscriber line (DSL); optical (e.g., Synchronous Optical NETwork, SONET) technologies; or other wired network technologies.

Figure 2:
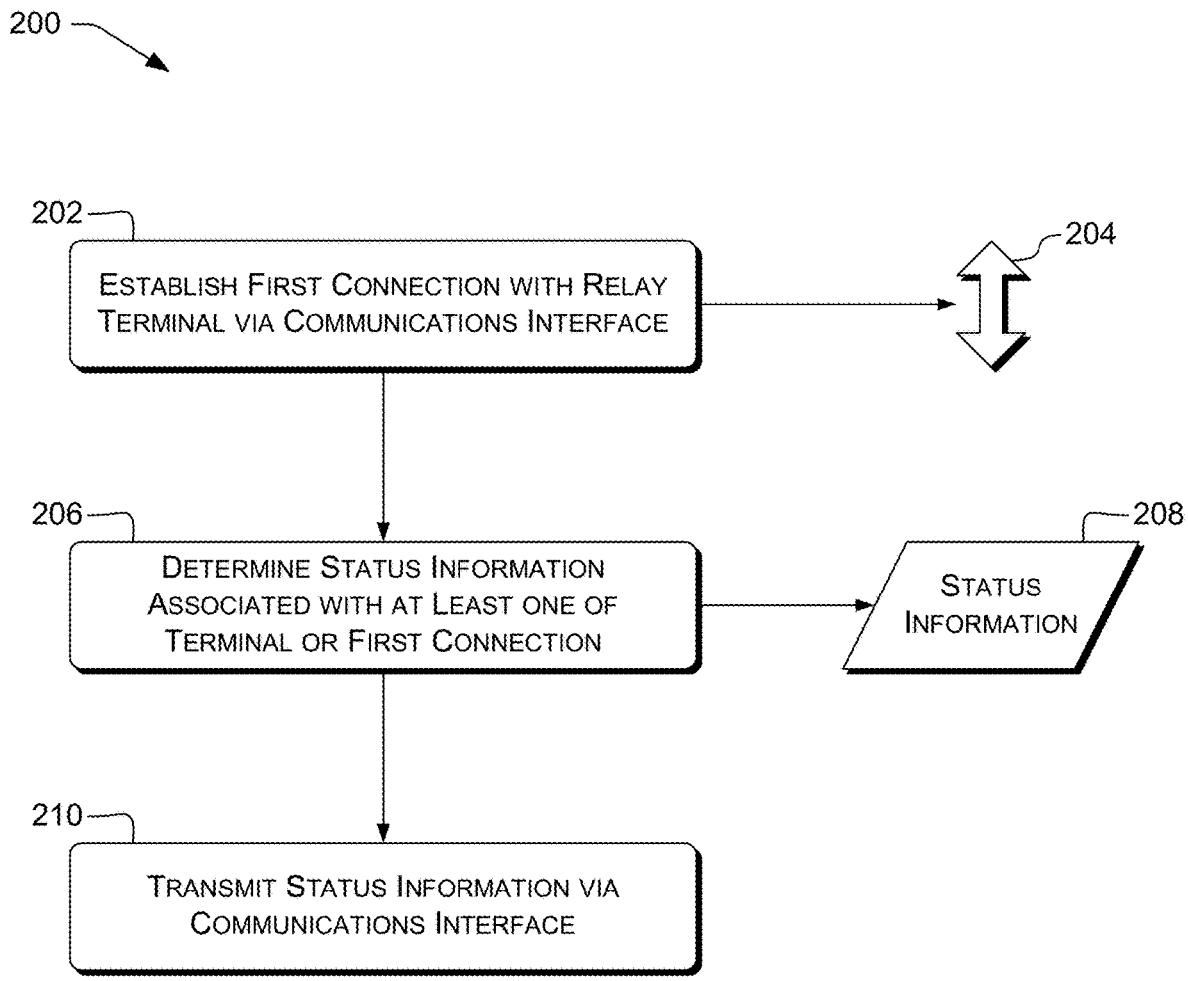
FIG. 2 is a dataflow diagram illustrating an example process for reporting status information of a remote terminal according to some implementations.

FIG. 2 illustrates an example process 200 for measuring a network at a terminal, e.g., remote terminal 106, and associated data items. In examples, remote terminal 106 includes a control unit configured to perform operations described below, e.g., in response to computer-executable instructions or FPGA configuration data implementing the response processing 134. Example control units are described herein with reference to FIG. 8.

Operations shown in FIGS. 2-7 can be performed in any order except when otherwise specified, or when data from an earlier step is used in a later step. Any operation shown in multiple figures can be as discussed with reference to the first figure in which that operation is shown. For example, block 206 can alternatively be performed before block 202.

Figure 7:
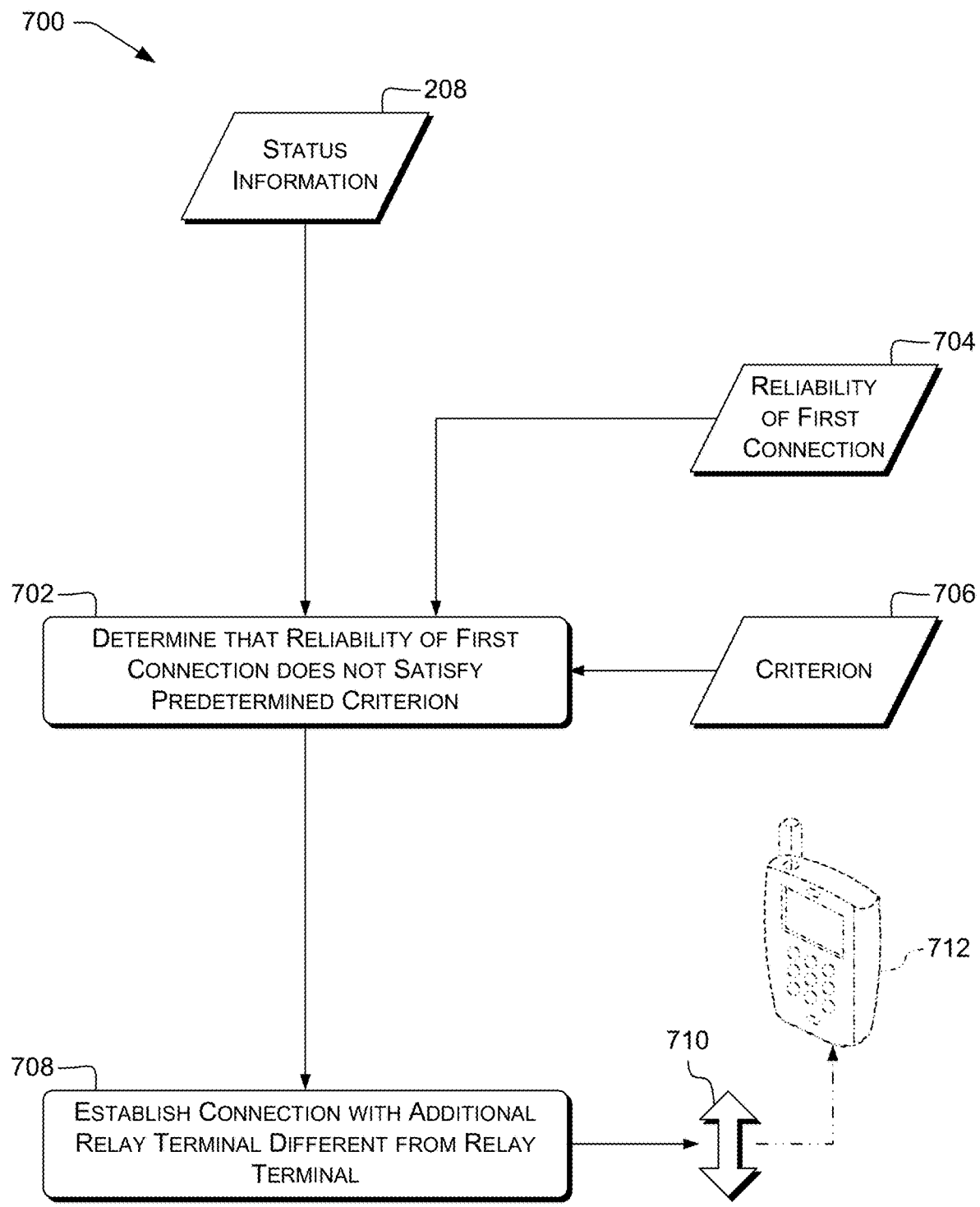
FIG. 7 is a dataflow diagram illustrating an example process for determining, at a remote terminal, that handover should be performed.
Figure 8:
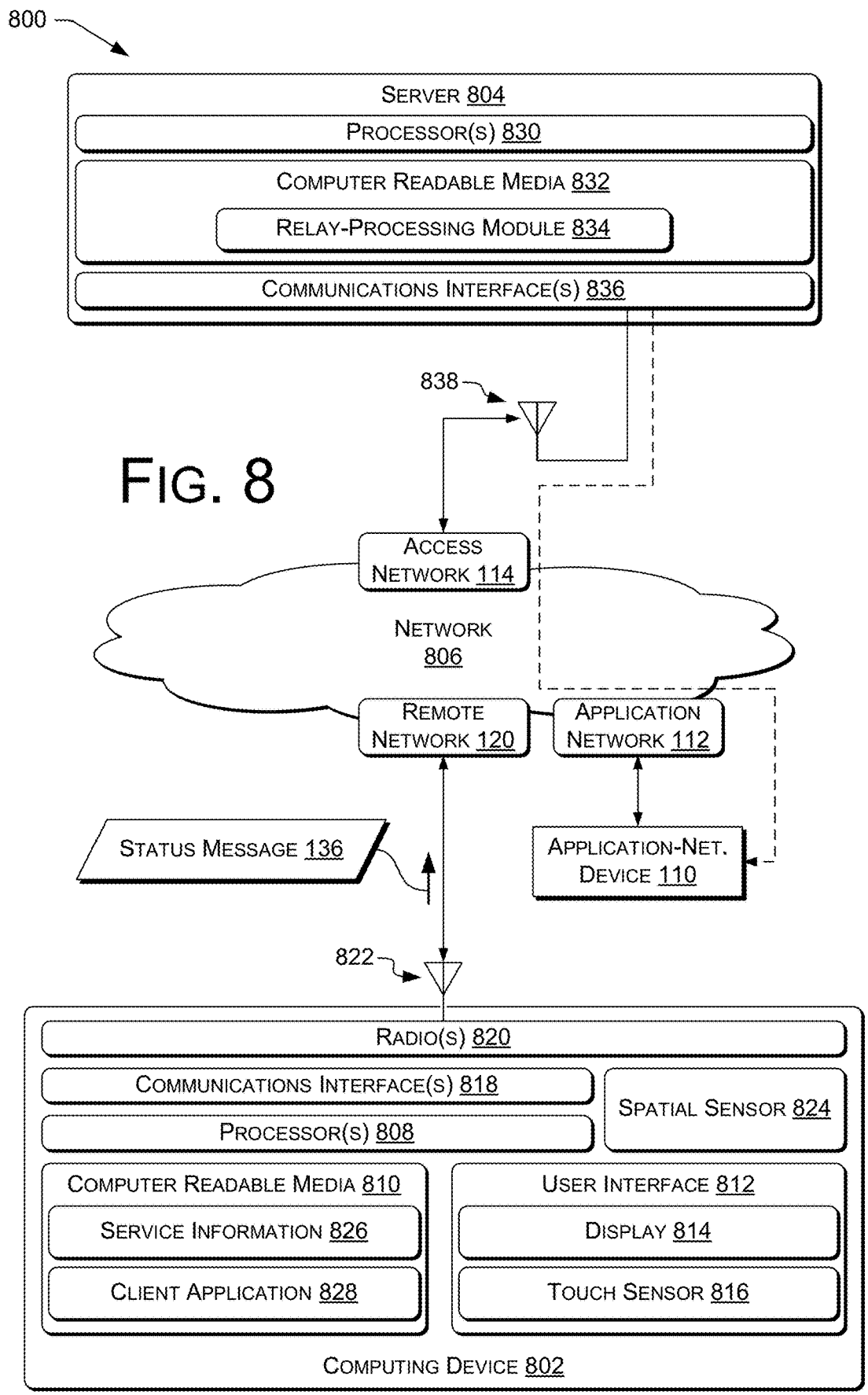
FIG. 8 is a block diagram illustrating components of a telecommunication system according to some implementations, and illustrating components of a terminal and a server of the telecommunication system.

For clarity of explanation, reference is made in the discussion of the flowcharts to various components shown in FIGS. 1 and 8 that can carry out or participate in the steps or operations of the exemplary method. It should be noted, however, that other components can be used; that is, exemplary method(s) shown in FIGS. 2-7 are not limited to being carried out by the identified components or using the identified messages.

In some examples, at block 202, the control unit can establish a first connection 204 (depicted as a double-headed arrow) with a relay terminal 102 (e.g., a terminal different from remote terminal 106) via a communications interface (e.g., interface 818, FIG. 8). For example, remote terminal 106 may be out of the coverage of access network 114, and relay terminal 102 may be within the coverage of access network 114. The control unit of remote terminal 106 can establish a sidelink, e.g., D2D, connection with relay terminal 102. In other examples, remote terminal 106 can establish a sidelink even if remote terminal 106 is within the coverage of access network 114.

In some examples, at block 206, the control unit can determine status information 208 associated with at least one of: the remote terminal 106, or the first connection. In some examples in which the first connection comprises a sidelink connection between the remote terminal 106 and the relay terminal 102, at least a portion of the status information 208 can be associated with the first connection. For example, the status information 208 can include a current time at the remote terminal 106, or an area of a 4G or 5G network within which remote terminal 106 is located. Additionally or alternatively, the status information 208 can include an indication of whether or not the remote terminal 106 is within range of a network base station, such as eNodeB 116, a gNodeB, or a WIFI AP.

In some examples, the status information 208 can include at least one of: a position of the terminal (e.g., tower-triangulated or GPS-derived); a velocity of the terminal (e.g., tower-triangulated, GPS-derived, or accelerometer-derived); a signal strength of the first connection at the terminal; a network-resource assignment, e.g., an assignment of resources to the first connection 204 or to the remote terminal 106; identification information of the terminal; a type of the first connection; identification information of an additional network (e.g., an access network or a different remote network), wherein the first connection is not carried via the additional network; a channel quality indicator (CQI) of the first connection; a Rank Indicator (RI) of the first connection; or a precoding matrix indicator (PMI) of the first connection.

In some examples, at block 210, the control unit can transmit, via the communications interface, the status information 208. For example, the control unit can transmit the status information 208 via the first connection 204, e.g., in or as status message 136. In some examples, the control unit can establish a relay bearer to relay terminal 102, which will in turn send traffic on that bearer to application-network device 110. The control unit can then transmit the status information 208 via the relay bearer.

In some examples, the control unit can transmit the status information 208 at least partly in response to a network event or message. Examples of network events or messages can include, but are not limited to, at least one of the following: establishment of the first connection 204; receipt of a monitor request message; completion of a monitor request procedure; receipt of a discovery response message; expiration of a predetermined periodic-reporting time; expiration of a timer (e.g., RRC connection link re-establishment timer T311, or RRC timers T301 or T310); receipt of a polling message, e.g., from eNodeB 116; receipt of a scheduling message, e.g., from eNodeB 116; or receipt of a query message. The query message can be, e.g., a pre-coded message from relay terminal 102 (or another terminal 102, 104, 106) to which firmware or pre-loaded software of remote terminal 106 is configured to respond by collecting or transmitting status information 208. Another example of a network event is arrival at the transmit buffer of data to be relayed via the first connection.

For example, at least a portion of status information 208 can be incorporated into a relay transmission for other purposes, e.g., in the form of a header or a data structure incorporated into padding bits (e.g., as is a padding BSR). Still another example of a network event is preparation of a remote-terminal reporting message. For example, at least a portion of status information 208 can be incorporated into a remote UE report message requested, e.g., by eNodeB 116 or relay terminal 102. Using a remote UE report message can permit updating the status information 208 known to the application-network device 110 as remote terminal 106 moves or its RF environment changes.

In some examples, the control unit can convert the status information 208 to a message or partial message in a particular format, or embed the status information 208 in such a message. Example formats can include, e.g., a header or body of an HTTP or SIP request, or an information element in a Packet Data Convergence Protocol (PDCP) message. Additionally or alternatively, the control unit can transform at least some of the status information 208 using a predetermined technique, and pack at least some of the transformed information. Examples of transformation techniques include Huffman or zip compression, Base64 encoding, and PGP encryption.

In some examples, reporting of status information 208 by remote terminal(s) 106, and collection of the status information by application-network device(s) 110, can permit determining the boundaries of wireless-network coverage areas with more accuracy and precision than previous schemes such as drive testing. Moreover, reporting of status information 208 by remote terminal(s) 106 permits tracking changes to the coverage boundary over time, with much finer time resolution than the intervals between drive tests. Such reporting and collection can also permit more accurately determining 5G coverage, since 5G transmission beams are very narrow and so may be missed during drive testing.

In some examples, as noted above, application-network device 110 can receive respective status information 208 associated with a plurality of remote terminals 106. For example, application-network device 110 can receive status information 208 over time and store it for later processing. Application-network device 110 can then present (e.g., via transmission of images or web pages to user-interface devices such as PCs or smartphones) a visual representation based at least in part on the respective status information 208. The visual representation can be a representation of the coverage area(s) of one or more access network(s), e.g., a map superimposed with locations of remote terminals 106 as reported in status information 208. The visual representation can superimpose location data for different frequencies (e.g., different bands) or radio-access technologies (e.g., LTE and 5G) for comparison between those frequencies or technologies. Additionally or alternatively, application-network device 110 can compute statistics such as the percentages of a given area that are within the coverage of respective RANs, or the percentage overlap between the respective coverage areas of various RANs.

Figure 3:
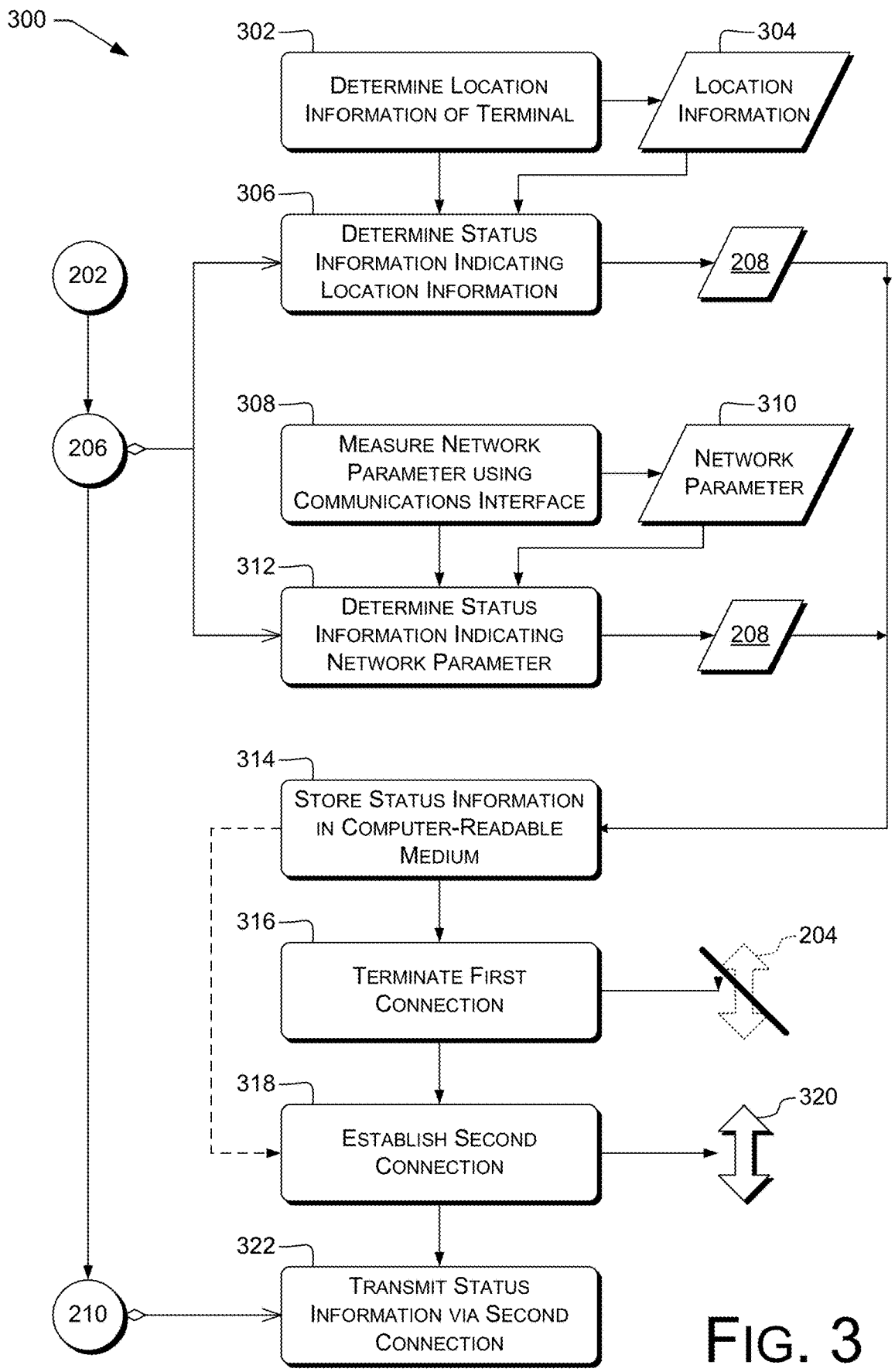
FIG. 3 is a dataflow diagram illustrating example processes for determining and reporting status information according to some implementations.

FIG. 3 is a dataflow diagram 300 illustrating example processes for determining or transmitting status information, and related data items. The illustrated processes can be carried out by a control unit, e.g., of a remote terminal 106, implementing response processing 134. In some examples, block 206 can include block 306 or block 312. In some examples, blocks 314, 316, or 318 can precede blocks 210 or 322. In some examples, block 210 can include block 322.

In some examples, at block 302, the control unit can determine location information 304 of the remote terminal 106, e.g., using a spatial sensor such as spatial sensor 824, FIG. 8. For example, the control unit can operate, communicate with, or read data from the spatial sensor 824. Block 302 can include, e.g., determining a position or velocity of remote terminal 106.

In some examples, the control unit can operate a GPS or other global navigation satellite system (GNSS) receiver to determine latitude and longitude. Additionally or alternatively, the control unit can perform position triangulation based on signals from multiple known-position transmitters, e.g., cell towers or broadcast stations. Additionally or alternatively, the control unit can request position information from a location resource function (LRF) or other device with which remote terminal 106 can communicate. Additionally or alternatively, the control unit can estimate its position by detecting a signature of its wireless environment and looking up the signature in a position database. A wireless-environment signature can include, e.g., the SSIDs of WIFI networks detectable by remote terminal 106 from its current location, or the frequencies of broadcast stations that remote terminal 106 is able to receive from its current location.

In some examples, at block 306, the control unit can determine the status information 208 indicating the location information 304. For example, the control unit can pack at least some of the status information 208 into a predetermined format for transmission. Examples of formats and packing are described herein with reference to block 206. For example, the control unit can determine location information 304 comprising latitude, longitude, and altitude, and format the latitude and longitude values as a string suitable for inclusion as a header value in an HTTP request.

In some examples, at block 308, the control unit can measure a network parameter 310 using the communications interface, e.g., communications interface 818, FIG. 8. For example, the control unit can operate, communicate with, or read data from the communications interface 818. The network parameter 310 can include, e.g., a parameter of the first connection 204, a parameter of a remote network 120 carrying the first connection, or a parameter of another network different from the remote network 120 carrying the first connection. Block 308 can include causing the communications interface 818 to query a network device such as an eNodeB 116. Additionally or alternatively, block 308 can include retrieving data the communications interface 818 has collected. Such information can include, e.g., RSSI or other signal-strength values; channel allocations (e.g., frequencies or timeslots); network types (e.g., 4G vs. 5G, or 3GPP vs. non-3GPP); network identifiers (e.g., MCC/MNC, or WIFI access-point name). As noted above, the network parameter 310 can additionally or alternatively include a signal strength of the first connection 204 at the remote terminal 106; a network-resource assignment; a type of the first connection 204; identification information of an additional network, wherein the first connection is not carried via the additional network; a channel quality indicator (CQI) of the first connection; a Rank Indicator (RI) of the first connection; or a precoding matrix indicator (PMI) of the first connection.

In some examples, at block 312, the control unit can determine the status information 208 indicating the network parameter 310. Example techniques discussed herein, e.g., with reference to blocks 206 and 306, for packing indications of location information 304 can additionally or alternatively be used for packing indications of network parameter(s) 310. For example, the network parameter 310 can indicate a 4G vs. 5G network type. The control unit can encode that indication as a single bit or group of n bits, e.g., n≤8, n≤16, or n≤32; a header (e.g., "X-Network: 4" or "X-Network: 5"), or the presence or absence of a header (e.g., "X-5G: true"). In some examples, both blocks 306 and 312 are used, each to provide a portion of the status information 208.

In some examples, at block 314, the control unit can store the status information 208 in a non-transitory computer-readable medium (CRM), e.g., CRM 810, FIG. 8. The CRM can be a computer storage medium such as a Flash memory or other NVRAM. Block 314 can be performed before transmitting the status information at block 210, as can blocks 316 and 318. Block 314 can be followed by block 316 or block 318.

In some examples, at block 316, the control unit can terminate the first connection 204. For example, the control unit can transmit a SIP BYE request; terminate a TCP connection such as one carrying an HTTP session; or transmit an RRC connection release message.

In some examples, at block 318, the control unit can establish a second connection 320 via the communications interface. Some examples are discussed herein, e.g., with reference to block 202. Additionally or alternatively, block 318 can include establishing a cellular connection, e.g., a 4G connection with an eNodeB or 5G connection with a gNodeB; establishing a non-cellular wireless connection, e.g., a WIFI or WIMAX connection with an access point, or a BLUETOOTH connection with a host device; or establishing a wired connection, e.g., a USB connection with a host device such as a PC, or an Ethernet connection to an Ethernet hub or switch.

In some examples, at block 322, the control unit can transmit the status information 208 via the second connection 320. Examples are discussed herein, e.g., with reference to blocks 206, 306, and 312. For example, the control unit can transmit the status message 136 via the second connection 320 instead of the first connection 204, or can transmit a second status message via the second connection 320.

Some examples include connections via different types of network. The first connection 204 can include a sidelink connection between the remote terminal 106 and the relay terminal 102. At least a portion of the status information 208 can be associated with the first connection 204. For example, the status information can indicate signal strength of the sidelink first connection 204. The second connection can include a connection via at least one of: a wireless local-area-network (e.g., WIFI) connection between the remote terminal 106 and an access point; or a cellular (e.g., LTE) connection between the remote terminal 106 and a base station (e.g., eNodeB 116). Various examples include all, fewer than all, or at least one of the features described in this paragraph.

Blocks 314-322 can be used to store status information 208 for later transmission. For example, if status information 208 is too large to be effectively transmitted via relay terminal 102, remote terminal 106 can store the information until a cellular or WIFI (or other higher-volume) connection is available, then report. This can reduce load on relay terminal 102 and relay-related network resources. In another example, block 202 is omitted. Block 206 is performed, e.g., to store status information 208 indicating the location of a region without cellular coverage (or without coverage of a specific generation, e.g., 4G or 5G). Block 314 is performed to store the status information 208. Block 316 is omitted since block 202 was omitted. When remote terminal 106 reaches the coverage area of a network, blocks 318 and 210 (including block 322) can be performed to report the information of the region without coverage. This can permit detecting regions without coverage with greatly reduced energy and time expenditure compared to drive testing. In some examples, users carry their terminals 106 to places they normally go, permitting detecting coverage gaps in those places. Fixing such coverage gaps can increase network availability in places frequented by users, which can improve the user experience.

In some examples, blocks 314-322 can be used to report additional status information about remote network 120. For example, the remote terminal 106 can store MCC/MNC pairs or other information from the relay terminal 102 for later reporting. This can permit evaluating connectivity of remote network 120 even if relay terminal 102 does not support the transmission of status messages 136 from remote terminal 106 to application-network device 110 (e.g., due to the absence of an inter-PLMN data roaming agreement).

Figure 4:
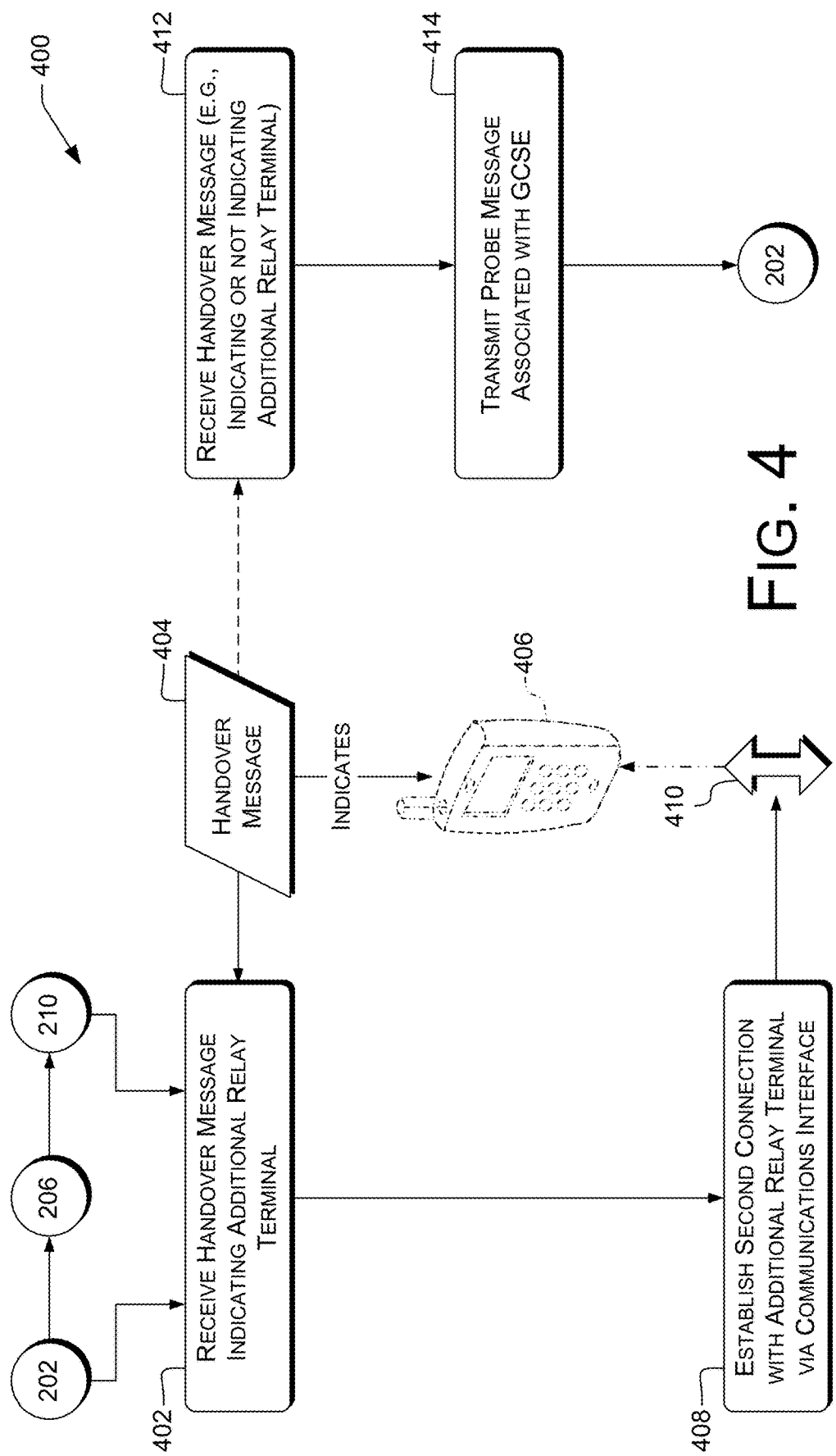
FIG. 4 is a dataflow diagram illustrating example processes for establishing remote-network connections at a remote terminal.

FIG. 4 is a diagram illustrating an example process 400 for handing over between networks, e.g., for establishing remote-network connections, and related data items. The illustrated process 400 can be carried out by a control unit, e.g., of a remote terminal 106. In some examples, block 202 or block 210 can be followed by block 402.

In some examples, at block 402, the control unit can receive, from the relay terminal 102 via the communications interface 818, a handover message 404 indicating an additional relay terminal 406 (shown in phantom) different from the relay terminal 102. Examples of sending of a handover message 404 by a relay terminal 102 are described herein with reference to FIGS. 5 and 6.

In some examples, at block 408, the control unit can establish a second connection 410 with the additional relay terminal 406 via the communications interface 818. Block 408 can be performed in response to the handover message 404 or to the receipt of the handover message 404. Examples are discussed herein, e.g., with reference to blocks 202 or 318. For example, the second connection 410 can be sidelink 124 with terminal 104 serving as additional relay terminal 406.

In some examples, handover message 404 does not indicate additional relay terminal 406. In these and other examples, the control unit of remote terminal 106 can use Group Communication System Enabler (GCSE) (3GPP No. 22.468) functions to locate relay terminal 102 or additional relay terminal 406. At 412, the control unit of remote terminal 106 can receive such a handover message 404. Examples are discussed herein, e.g., with reference to block 402.

At 414, the control unit can transmit a probe message requesting network service associated with a GCSE group. This can be done, e.g., according to 3GPP standards for GCSE probes.

In some examples, multiple remote terminals 106 are members of a communication group, e.g., a GCSE communication group, of relay terminal 102 or additional relay terminal 406. Multiple remote terminals 106 in the same GCSE group can communicate with the same relay terminal 102, 406. In some examples, a terminal 102, 406 can begin acting as a UE-to-UE relay by autonomously starting a ProSe group and sending a beacon message advertising its capability to remote terminal(s) 106 in the corresponding GCSE group. Additionally or alternatively, a remote terminal 106 can periodically (or intermittently) transmit probe messages requesting relay service for a specific GCSE group. In response to the probe message, the terminal 102, 406 can accept the request and start acting as a relay terminal. Additionally or alternatively, a terminal 102, 406 can receive a command, e.g., via a user interface thereof, requesting that the terminal 102, 406 act as a relay terminal with respect to a particular GCSE group, or with respect to specific remote terminal(s) 106. The terminal 102, 406 can then establish a GCSE group for the indicated remote terminal(s) 106.

Figure 5:
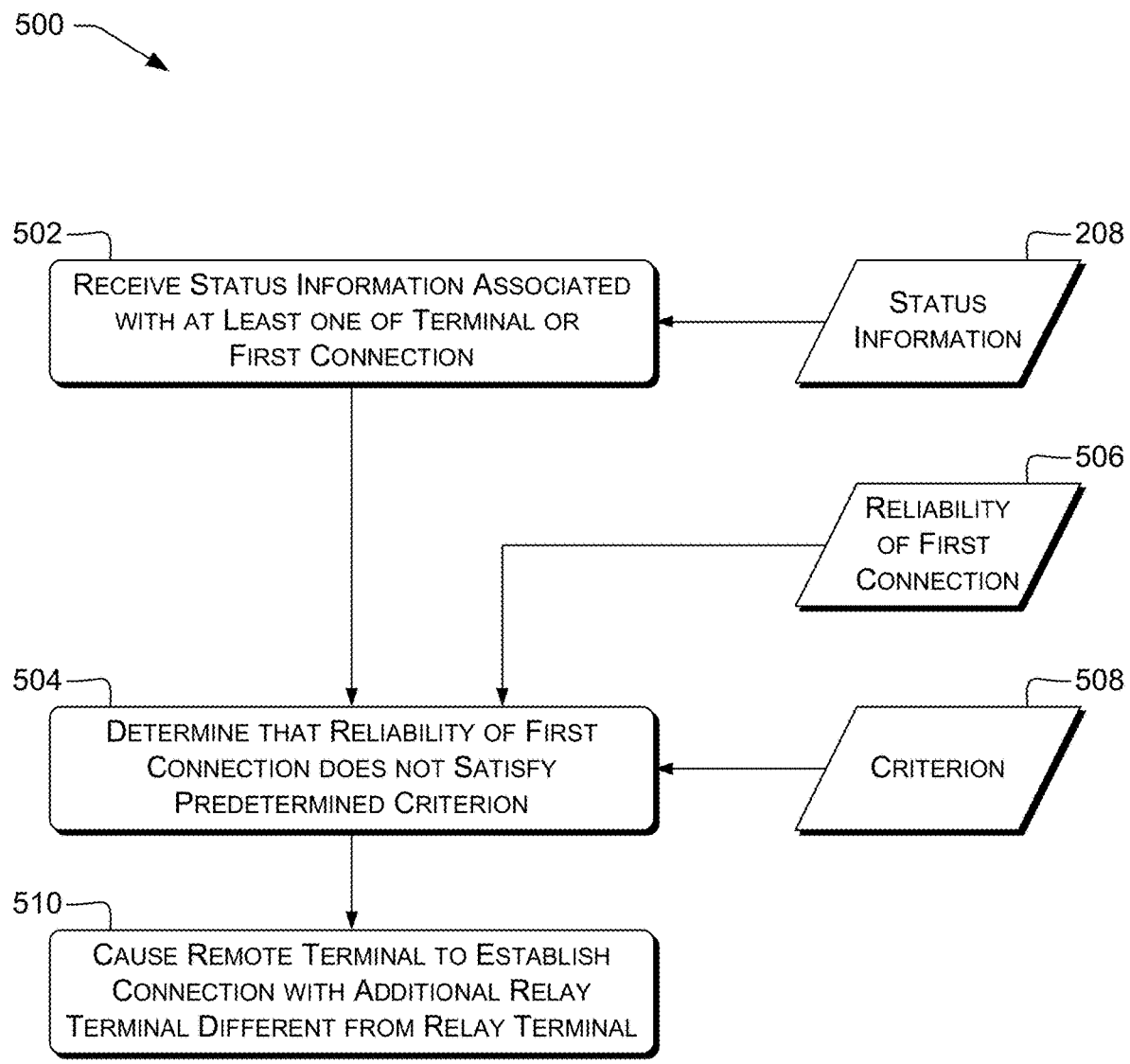
FIG. 5 is a dataflow diagram illustrating an example process for triggering a handover of a remote terminal.

FIG. 5 illustrates an example process 500 for managing network connections, and related data items. The illustrated process 500 can be carried out by a control unit, e.g., of a relay terminal 102 or 406. The control unit can be configured to perform operations described below, e.g., in response to computer-executable instructions or FPGA configuration data implementing the relay processing 132. The relay terminal 102 can include one or more antennas 822, 838 and a communications interface 818, 836 coupled to at least one of the one or more antennas 822, 838 and communicatively connectable with an access network 114, 126. In some examples, process 500 is carried out when relay terminal 102 is within coverage of access network 114, although this is not limiting.

In some examples, at block 502, the control unit can receive, from a remote terminal 106 via the communications interface 818, 836, status information 208 associated with at least one of the remote terminal 106 or a first connection 204. The first connection 204 can be a connection between the relay terminal 102 and the remote terminal 106, e.g., a sidelink connection. The remote terminal 106 can be out of coverage of access network 114. Examples of status information are described herein with reference to FIGS. 2 and 3.

In some examples, at block 504, the control unit can make a determination, based at least in part on the status information 208, that a reliability 506 of the first connection 204 does not satisfy a predetermined criterion 508. The reliability 506 can indicate how likely the first connection 204 is to continue in an operational state for a predetermined period of time. Additionally or alternatively, the reliability 506 can indicate an expected lifetime of the first connection 204. In some examples, the control unit can collect multiple reports of status information 208 over time, fit a trendline (e.g., linear, log, exponential, or polynomial with any degree >1) (e.g., fit via least-squares, maximum-likelihood estimation, or other regression techniques) to corresponding portions of the reports of the status information 208, and project along the trendline to determine the reliability 506.

In some examples, the reliability 506 can be based on measurements of the signal strength (e.g., RSSI, SNR, SINR, RSRP, or RSRQ) of the first connection 204 over time. The reliability 506 can indicate the forecast signal strength at a predetermined time in the future, or a forecast time at which the signal strength will fall below a predetermined threshold. In other examples, the reliability 506 can be based on measurements of the respective positions of the relay terminal 102 and the remote terminal 106 (e.g., measurements of the distance between those terminals) over time. The reliability 506 can indicate the forecast distance between terminals at a predetermined time in the future, or a forecast time at which the distance between terminals will exceed a range of the first connection 204.

In some examples, the criterion 508 can include a threshold of signal strength or distance. In other examples, the criterion 508 can include a duration of time (e.g., 60s) over which the first connection 204 should be maintained. If the forecast signal strength or time from the reliability 506 is lower than the criterion 508, or the forecast distance is higher than the criterion 508, the relay terminal 102 can trigger a handover. In some examples, multiple criteria 508 can be used, and the relay terminal 102 can trigger a handover if the reliability fails to satisfy at least one of the criteria 508; a predetermined number or percentage of the criteria 508; or all of the criteria 508.

In some examples, at block 510, the control unit can, in response to the determination at block 504, cause the remote terminal 106 to establish a connection 410 with an additional relay terminal 406 different from the relay terminal 102. The additional relay terminal 406 can also be within the coverage of access network 114, or within the coverage of another access network such as access network 126. In some examples, block 510 includes transmitting a handover message 404 to the remote terminal 106 via the communications interface 818, 836. In some examples, block 510 includes releasing the first connection 204 at the relay terminal or terminating the first connection 204, after which the remote terminal 106 will attempt to discover other connections.

Therefore, while in some examples the control unit specifies the additional relay terminal 406 to be used, in other examples the choice of additional relay terminal is left to the remote terminal 106. In some examples, the remote terminal 106 can disconnect from the relay terminal 102 before, upon, or after connecting to the additional relay terminal 406; in other examples, remote terminal 106 can be concurrently connected with both the relay terminal 102 and the additional relay terminal 406.

In some examples, the reliability 506 can indicate present or forecast network loading, or a forecast time to network overload. The load can be, e.g., load of a particular eNodeB 116 or of a particular remote network 120 operated by relay terminal 102. The criterion 508 can include a threshold of loading. Therefore, e.g., if load is increasing over time, relay terminal 102 can cause remote terminal 106 to hand over to additional relay terminal 406. In still other examples, block 510 can be performed based on expiration of a timer.

Figure 6:
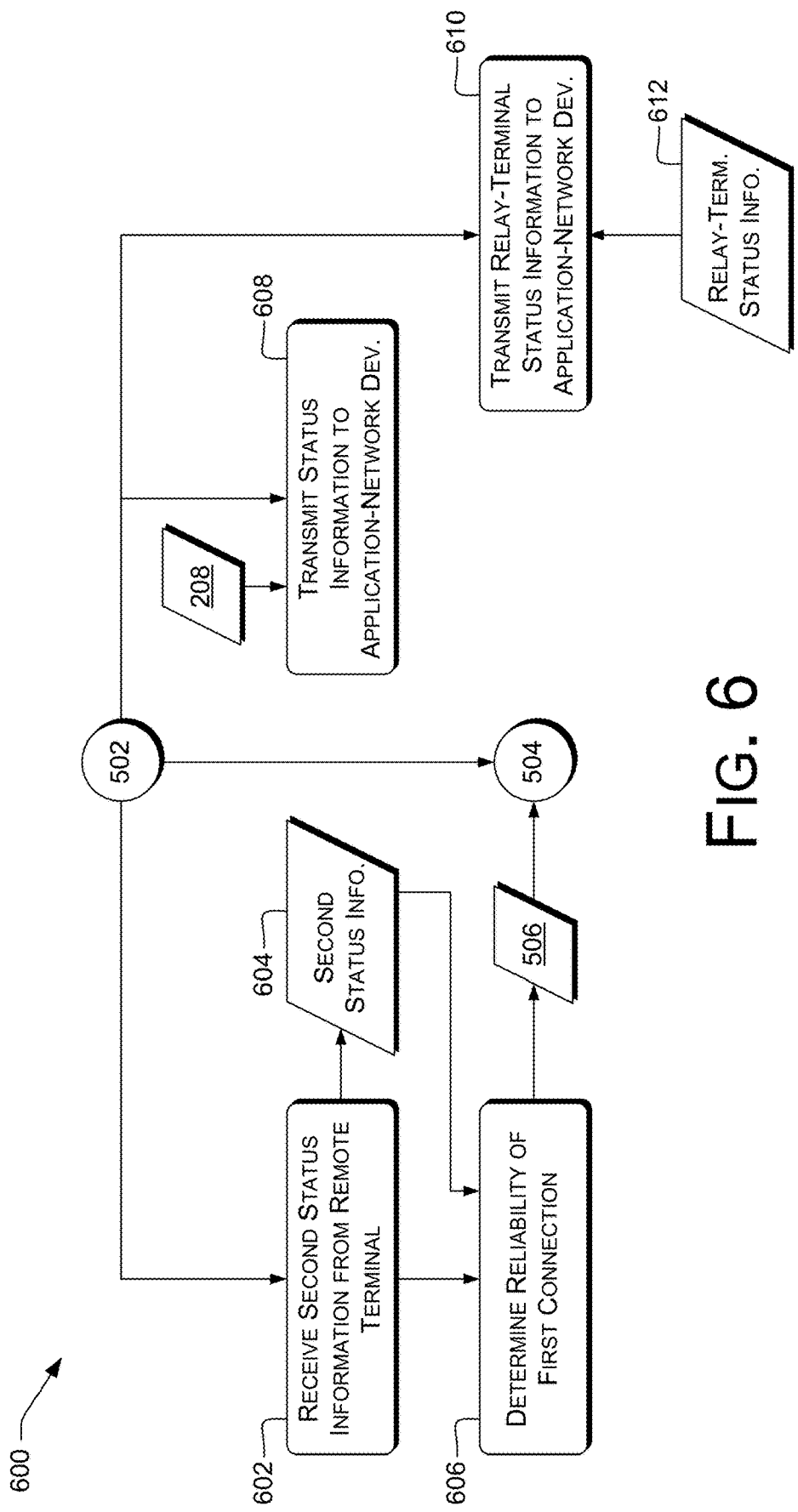
FIG. 6 is a dataflow diagram illustrating example processes for reporting status information and triggering handovers according to some implementations.

FIG. 6 is a diagram 600 illustrating example processes for processing status information or triggering handovers, and related data items. The illustrated processes can be carried out by a control unit, e.g., of a relay terminal 102, implementing the relay processing 132. In some examples, block 606 can precede or be included in block 504. In some examples, blocks 602 and 606 can follow block 502. In some examples, block 502 can be followed by block 602, block 608, or block 610. In some examples, blocks 602 and 606 can precede block 504. In some examples, only blocks 502 and 608 are used. In some examples, only blocks 502, 608, and 610 are used.

In some examples, at block 602, the control unit can receive, from the remote terminal via the communications interface, second status information 604. For example, the control unit can receive the second status information 604 at a different time than it receives the status information 208. Additionally or alternatively, the control unit can receive the status information 208 and the second status information 604 concurrently, and each of status information 208 and 604 can represent status of the remote terminal 106 or the first connection 204 at a different time.

In some examples, at block 606, the control unit can determine, based at least in part on the status information 208 and the second status information 604, the reliability 506 of the first connection 204. For example, the control unit can use the status information 208, 604 to form a time series of signal strength, location information, or other data, and forecast the value to determine the reliability 506. Examples are discussed herein, e.g., with reference to block 504.

In some examples, at block 608, the control unit can transmit at least some of the status information 208 to an application-network device 110. For example, the application-network device 110 can be a server that is not part of an access network 114, e.g., a command-and-control or reporting server. Block 608 can permit determining network coverage or locating network gaps, e.g., as discussed herein with reference to blocks 210 or 322. In some examples, block 608 can include reporting MCC/MNC pairs or other network-related information of remote terminals 106 that have connected to relay terminal 102, or that have attempted to connect to relay terminal 102.

In some examples, the application-network device 110 can be or include an eNodeB 116, a ProSe function, a ProSe AS, or an application-network device 110 dedicated or designated to collect status information 208. At block 608, the control unit can include the at least some of the status information 208 in a ProSe Discovery Request or Monitor Request message. This can permit providing status information 208 during the initial ProSe discovery process. The ProSe function can in turn use the status information 208 in managing resource allocations for D2D communications.

In some examples, terminal 106 can transmit status information 208 during a ProSe handshake between two terminals, or during a ProSe registration process between terminal 106 and a ProSe function. In some aspects, the remote terminal 106 only transmits status information 208 (block 210), or the relay terminal only forwards status information 208 (block 608), at a time of initial handshake or registration. This can reduce bandwidth usage compared to more frequent reporting.

In some examples, at block 610, the control unit can transmit relay-terminal status information 612 in association with the at least some of the status information 208 to the application-network device 110. The relay-terminal status information 612 can include any of the types of information described herein with reference to status information 208 or second status information 604. For example, the relay-terminal status information 612 can include information about the location of relay terminal 102 including the control unit. The application-network device 110 can use this relay-terminal status information 612 together with status information 208 indicating the location of remote terminal 106 to determine the effective range of first connection 204, e.g., a sidelink connection. Additionally or alternatively, the application-network device 110 can analyze changes in the range, quantity, or signal strength of first connections 204 as a function of network load, time of day, or other factors.

FIG. 7 illustrates an example process 700 for managing network connections, and related data items. The illustrated process 700 can be carried out by a control unit, e.g., of a remote terminal 106. The control unit can be configured to perform operations described below, e.g., in response to computer-executable instructions or FPGA configuration data implementing the response processing 134. The remote terminal 106 can include one or more antennas 822, 838 and a communications interface 818, 836 coupled to at least one of the one or more antennas 822, 838 and communicatively connectable with a remote network 120. In some examples, process 500 is carried out when remote terminal 106 is in communication with a relay terminal 102 and relay terminal 102 is within coverage of access network 114, although this is not limiting.

In some examples, at block 702, the control unit can make a determination, based at least in part on the status information 208, that a reliability 704 of the first connection 204 does not satisfy a predetermined criterion 706. Examples are discussed herein, e.g., with reference to block 504. In some examples, reliability 704 can represent reliability 506. In some examples, criterion 706 can represent criterion 508.

In some examples, at block 708, the control unit can, in response to the determination at block 702, establish a connection 710 with an additional relay terminal 712 (which can represent additional relay terminal 406) different from the relay terminal 102. Examples are discussed herein, e.g., with reference to blocks 318 or 408. The additional relay terminal 712 can also be within the coverage of access network 114, or within the coverage of another access network such as access network 126. In some examples, block 510 includes sending an RRC or other-protocol disconnection message to relay terminal 102 via first connection 204, e.g., as discussed herein with reference to block 316.

In some examples, reliability 704, criterion 706, or additional relay terminal 712 can be different from reliability 506, criterion 508, or additional relay terminal 406, respectively. In some examples of process 500, the control unit of the relay terminal 102 can use information from eNodeB 116, from other terminals attached to access network 114, or from other remote terminals 106 attached to relay terminal 102 via remote network 120. By contrast, in some examples of process 700, the control unit of the remote terminal 106 may have available only information from the relay terminal 102 and the additional relay terminal 712. In some examples, the control unit of the remote terminal 106 may not have any information from the relay terminal 102 or the additional relay terminal 712 except for what can be measured at the remote terminal 106. Therefore, in some examples, the reliability 704 and the criterion 706 are based on parameters measurable at the remote terminal 106, e.g., network signal strength measures described herein, round-trip time, or timers.

Illustrative Computing Systems

FIG. 8 is a block diagram illustrating a system 800, e.g., a telecommunication system, permitting requesting status information, reporting status information, or triggering handover, according to some implementations. The system 800 includes a computing device 802, e.g., a wireless phone or other user equipment, which can represent terminal 102 or 104, FIG. 1, e.g., a terminal of a telecommunications network 108. Computing device 802 can be coupled to a server 804 via a telecommunications network 806, which can represent network 108, FIG. 1. The server 804 can be an example of the application-network device(s) 110 or the relay terminal 102, FIG. 1. Computing device 802 can be, e.g., an original equipment manufacturer (OEM) handset, a non-OEM handset, or a computing device running OTT SIP client software.

For clarity of explanation, computing device 802 will be discussed in the context of a remote terminal 106 and server 804 will be discussed in the context of a relay terminal 102. However, this is not limiting. Except as expressly described herein, components described with reference to computing device 802 or server 804 can be used in implementing a called terminal, a calling terminal, an application-network device 110, an eNodeB 116, an MME 118, or another client or server of or communicatively connectable with or via telecommunications network 108.

The network 806 can include one or more networks, such as a cellular network and a data network. The network 806 can include one or more core network(s) connected to terminals, e.g., terminals 102, 104, or 106, via one or more access network(s) 114 or remote network(s) 120. In some examples, network 806 can include any present or future IP-based network technology or evolution of an existing IP-based network technology. In some examples, network 806 includes an access-agnostic application network 112, e.g., IMS, and one or more access networks 114, 126.

The computing device 802 can be or include a wireless phone, a wired phone, a tablet computer, a laptop computer, a wristwatch, or other type of computing device. The computing device 802 can include at least one processor 808, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). The computing device 802 can include one or more computer readable media (CRM) 810, such as memory (e.g., random access memory (RAM), solid state drives (SSDs), or the like), disk drives (e.g., platter-based hard drives), another type of computer-readable media, or any combination thereof. CRM 810 can store various types of instructions and data, such as an operating system, device drivers, etc. Computer-executable instructions stored in CRM 810 can be arranged in modules or components. Stored computer-executable instructions can be executed by the processor 808 to perform the various functions described herein. In some examples, CRM 810 can be or include nonvolatile memory on a SIM card.

CRM 810 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 808. Tangible computer-readable media can include volatile and nonvolatile, removable and non-removable media implemented in any method or technology for storage of information, such as computer-executable instructions, data structures, program modules, or other data.

The computing device 802 can further include a user interface (UI) 812, e.g., including an electronic display device 814, a touch sensor 816, a speaker, a microphone, a vibration unit, or other devices for presenting information to a user or receiving commands from the user. The user interface 812 can include a user control such as a "call" button to indicate a communication session should be initiated. The user interface 812 or components thereof, e.g., the electronic display device 814, can be separate from the computing device 802 or integrated (e.g., as illustrated in FIG. 1) with the computing device 802.

The computing device 802 can further include one or more communications interface(s) 818 configured to selectively communicate via the network 806. For example, communications interface(s) 818 can operate one or more radio(s) 820 of computing device 802 to communicate via network 806. Radio(s) 820 can, e.g., communicate via access network(s) 114, 126 or remote network(s) 120. Communications interface(s) 818 can additionally or alternatively include one or more transceivers or other components configured to communicate using wired connections via the network 806. In some examples, communications interface(s) 818, or an individual communications interface 818, can include or be communicatively connected with transceivers or radio units for multiple types of access networks, e.g., at least two of 2G, 3G, LTE, or WIFI.

In some examples, computing device 802 includes one or more antennas 822, communicatively coupled with the communications interface. The antenna(s) 822 can include, e.g., single-band or multi-band antennas.

In some examples, computing device 802 includes a spatial sensor 824. Examples include a GPS, GLONASS, or Galileo receiver; an accelerometer; an inertial measurement unit (IMU); or an orientation sensor. Spatial sensor 824 can provide location information of computing device 802. Spatial sensor 824 can include an antenna (e.g., a GNSS antenna) or can be coupled to antenna 822. Spatial sensor 824 can include circuitry or logic to detect signals from GNSS satellites, cellular base stations, or other radio sources, and provide at least one of latitude, longitude, altitude, or time data based on those signals.

In some examples, CRM 810 can store service information 826 used for initializing communications. For example, service information 826 can include location information of a user of computing device 802, e.g., stored on a SIM card or on internal memory of a smartphone computing device 802. In some examples, service information 826 can include identification information of computing device 802 or a registered subscriber thereof, e.g., an IMEI or IMSI.

CRM 810 can include computer-executable instructions of a client application 828 or other modules or components. The client application 828, e.g., a native or other dialer, can permit a user to originate and terminate communication sessions associated with the computing device 802, e.g., a wireless phone. In some examples, the client application 828 can implement response processing 134. For example, the client application 828 can cause computing device 802 to transmit a status message 136 to the server 804 or another network-connected device. In some examples, the computer-executable instructions of the client application 828 can be executed by the processor 808 to perform various functions described herein, e.g., with reference to at least one of FIGS. 1-7. For example, client application 828 can represent or perform response processing 134, FIG. 1. In some examples, client application 828 can be, include, or represent a response-processing module.

The server 804 can include at least one processor 830 and one or more computer readable media 832. As noted above, server 804 can represent relay terminal 102, FIG. 1. CRM 832 can be used to store computer-executable instructions of a relay-processing module 834 or other modules or components. Relay-processing module 834 can represent or perform relay processing 132, FIG. 1. The computer-executable instructions can be executed by the processor 830 to perform various functions described herein, e.g., with reference to at least one of FIG. 1, 5, or 6. In some examples, relay-processing module 834 can cause the control unit to receive status information 208, e.g., in a status message 136, forward the status information 208 to application-network device 110 (shown dashed), or trigger handover of computing device 802.

The server 804 can include one or more communications interface(s) 836, e.g., of any of the types described above with reference to communications interface(s) 818. The communications interface(s) 836 can be connected with one or more antenna(s) 838. For example, server 804 can communicate via communications interface(s) 836 with terminal 106 or application-network devices 110.

In some examples, processor 808 and, if required, CRM 810, are referred to for brevity herein as a "control unit." Other examples of control units can include processor 830 with, if required, CRM 832. For example, a control unit can include a CPU or DSP and instructions executable by that CPU or DSP to cause that CPU or DSP to perform functions described herein. In some such examples, client application 828 or relay-processing module 834 can comprise computer-executable instructions. Additionally or alternatively, a control unit can include an ASIC, FPGA, or other logic device(s) wired (in layout, or via blown fuses or logic-cell configuration data) to perform functions described herein. In some such examples, client application 828 or relay-processing module 834 can comprise circuitry, configuration data, or other physical structures or data to cause the logic device to perform the corresponding functions described herein.

Example Clauses

Various examples include one or more of, including any combination of any number of, the following example features.

A: A terminal of a telecommunications network, the terminal comprising: one or more antennas; a communications interface coupled to at least one of the one or more antennas and communicatively connectable with a relay terminal; and a control unit configured to perform operations comprising: establishing a first connection with the relay terminal via the communications interface; determining status information associated with at least one of the terminal or the first connection; and transmitting, via the communications interface, the status information.

B: The terminal according to paragraph A, wherein the operations further comprise: receiving, from the relay terminal via the communications interface, a handover message indicating an additional relay terminal different from the relay terminal; and in response, establishing a second connection with the additional relay terminal via the communications interface.

C: The terminal according to paragraph A or B, wherein the operations further comprise transmitting the status information at least partly in response to at least one of: establishment of the first connection; receipt of a monitor request message; completion of a monitor request procedure; receipt of a discovery response message; expiration of a timer; data to be relayed via the first connection; preparation of a remote-terminal reporting message; receipt of a polling message; receipt of a scheduling message; or receipt of a query message.

D: The terminal according to any of paragraphs A-C, wherein: the terminal further comprises a spatial sensor; and the operations further comprise: determining location information of the terminal using the spatial sensor; and determining the status information indicating the location information.

E: The terminal according to any of paragraphs A-D, wherein the operations further comprise: measuring a network parameter using the communications interface; and determining the status information indicating the network parameter.

F: The terminal according to any of paragraphs A-E, wherein: the terminal further comprises a non-transitory computer-readable medium (CRM); and the operations further comprise: before transmitting the status information: storing the status information in the CRM; terminating the first connection; and establishing a second connection via the communications interface; and transmitting the status information via the second connection.

G: The terminal according to paragraph F, wherein: the first connection comprises a sidelink connection between the terminal and the relay terminal; at least a portion of the status information is associated with the first connection; and the second connection comprises a connection via at least one of: a wireless local-area-network connection between the terminal and an access point; or a cellular connection between the terminal and a base station.

H: The terminal according to any of paragraphs A-G, wherein the status information indicates at least one of: a position of the terminal; a velocity of the terminal; a signal strength of the first connection at the terminal; a network-resource assignment; identification information of the terminal; a type of the first connection; identification information of an additional network, wherein the first connection is not carried via the additional network; a channel quality indicator (CQI) of the first connection; a Rank Indicator (RI) of the first connection; or a precoding matrix indicator (PMI) of the first connection.

I: A method, comprising, by a remote terminal of a telecommunications network: establishing a first connection with a relay terminal via a communications interface of the remote terminal, wherein the first connection is a sidelink connection; determining status information associated with at least one of the remote terminal or the first connection; and transmitting, via the communications interface, the status information.

J: The method according to paragraph I, further comprising: determining location information of the remote terminal using a spatial sensor; and determining the status information indicating the location information.

K: The method according to paragraph I or J, further comprising: measuring a network parameter using the communications interface; and determining the status information indicating the network parameter.

L: The method according to any of paragraphs I-K, further comprising: before transmitting the status information, establishing a second connection via the communications interface; and transmitting the status information via the second connection, wherein the second connection comprises a connection via at least one of: a wireless local-area-network connection between the remote terminal and an access point; or a cellular connection between the remote terminal and a base station.

M: The method according to any of paragraphs I-L, further comprising, before establishing the first connection, transmitting a probe message requesting network service associated with a Group Communication System Enabler (GCSE) group.

N: The method according to paragraph M, further comprising, before transmitting the probe message, receiving a handover message from a second relay terminal different from the relay terminal.

O: The method according to any of paragraphs I-N, wherein the status information indicates at least one of: a position of the remote terminal; a velocity of the remote terminal; a signal strength of the first connection at the remote terminal; a network-resource assignment; identification information of the remote terminal; a type of the first connection; identification information of an additional network, wherein the first connection is not carried via the additional network; a channel quality indicator (CQI) of the first connection; a Rank Indicator (RI) of the first connection; or a precoding matrix indicator (PMI) of the first connection.

P: A relay terminal of a telecommunications network, the relay terminal comprising: one or more antennas; a communications interface coupled to at least one of the one or more antennas and communicatively connectable with an access network; and a control unit configured to perform operations comprising: receiving, from a remote terminal via the communications interface, status information associated with at least one of the remote terminal or a first connection, the first connection between the relay terminal and the remote terminal; making a determination that a reliability of the first connection does not satisfy a predetermined criterion based at least in part on the status information; and in response to the determination, causing the remote terminal to establish a connection with an additional relay terminal different from the relay terminal.

Q: The relay terminal according to paragraph P, wherein the operations further comprise: receiving, from the remote terminal via the communications interface, second status information; and determining, based at least in part on the status information and the second status information, the reliability of the first connection.

R: The relay terminal according to paragraph P or Q, wherein the control unit is configured to perform the causing at least partly by transmitting a handover message to the remote terminal via the communications interface.

S: The relay terminal according to any of paragraphs P-R, wherein the status information indicates at least one of: a position of the remote terminal; a velocity of the remote terminal; a signal strength of the first connection at the remote terminal; a network-resource assignment; identification information of the remote terminal; a type of the first connection; identification information of a second network, wherein the first connection is not carried via the second network; a channel quality indicator (CQI) of the first connection; a Rank Indicator (RI) of the first connection; or a precoding matrix indicator (PMI) of the first connection.

T: The relay terminal according to any of paragraphs P-S, wherein the operations further comprise transmitting at least some of the status information to an application-network device.

U: The relay terminal according to any of paragraphs P-T, wherein: the operations further comprise transmitting relay-terminal status information in association with the at least some of the status information to the application-network device; and the second status information indicates at least one of: a position of the remote terminal; a velocity of the remote terminal; a signal strength of the first connection at the remote terminal; a network-resource assignment; identification information of the remote terminal; a type of the first connection; identification information of a second network, wherein the first connection is not carried via the second network; a channel quality indicator (CQI) of the first connection; a Rank Indicator (RI) of the first connection; or a precoding matrix indicator (PMI) of the first connection.

V: A remote terminal of a telecommunications network, the terminal comprising: one or more antennas; a communications interface coupled to at least one of the one or more antennas and communicatively connectable with a relay terminal via a remote network; and a control unit configured to perform operations comprising: determining status information associated with at least one of the remote terminal or a first connection, the first connection between the relay terminal and the remote terminal via the remote network; making a determination that a reliability of the first connection does not satisfy a predetermined criterion based at least in part on the status information; and, in response to the determination, establishing a connection with an additional relay terminal different from the relay terminal.

W: The remote terminal according to paragraph V, wherein the operations further comprise: after determining the status information, determining second status information; and determining, based at least in part on the status information and the second status information, the reliability of the first connection.

X: The remote terminal according to paragraph V or W, wherein the operations further comprise transmitting a probe message requesting network service associated with a Group Communication System Enabler (GCSE) group before establishing the connection with the additional relay terminal.

Y: The remote terminal according to any of paragraphs V-X, wherein the status information indicates at least one of: a position of the remote terminal; a velocity of the remote terminal; a signal strength of the first connection at the remote terminal; a network-resource assignment; identification information of the remote terminal; a type of the first connection; identification information of a second network different from the remote network; a channel quality indicator (CQI) of the first connection; a Rank Indicator (RI) of the first connection; or a precoding matrix indicator (PMI) of the first connection.

Z: The remote terminal according to any of paragraphs V-Y, wherein the operations further comprise transmitting at least some of the status information to an application-network device.

AA: A computer-readable medium, e.g., a computer storage medium, having thereon computer-executable instructions, the computer-executable instructions upon execution configuring a computer to perform operations as any of paragraphs A-H, I-O, P-U, or V-Z recites.

AB: A device comprising: a processor; and a computer-readable medium, e.g., a computer storage medium, having thereon computer-executable instructions, the computer-executable instructions upon execution by the processor configuring the device to perform operations as any of paragraphs A-H, I-O, P-U, or V-Z recites.

AC: A system comprising: means for processing; and means for storing having thereon computer-executable instructions, the computer-executable instructions including means to configure the system to carry out a method as any of paragraphs A-H, I-O, P-U, or V-Z recites.

AD: A method comprising performing operations as any of paragraphs A-H, I-O, P-U, or V-Z recites.

AE: A method comprising, at an application-network device, receiving respective status information associated with a plurality of remote terminals; and presenting a visual representation based at least in part on the respective status information.

CONCLUSION

Example techniques herein permit initialization operations to succeed in the face of failures that might otherwise not resolve themselves, e.g., missing location information. This can save both core and access bandwidth. This savings of data transfer over the access network can reduce the time and energy required to conduct the initialization, which can increase performance of network 108 for multiple users, and can increase battery life of a portable terminal 102. Some examples herein reduce signaling traffic, as described herein, by not retrying, at the terminal, a request that will not succeed. The reduction in bandwidth used can reduce the probability of network overload or outage.

Various examples herein relate to services that require location information. For example, a TAS may require location information to satisfy emergency-services requirements, as discussed above. This is not limiting, and examples herein can be used with any combination of mandatory or discretionary network devices that do or do not require location information (for a total of four options per network device). For example, machine-to-machine communications may involve a TAS or other AS that does not require location information.

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE.

Example data items depicted as parallelograms in FIGS. 1-7; example messages in FIGS. 1 and 4; and example process blocks in FIGS. 2-7 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

In the claims, any reference to a group of items provided by a preceding claim clause is a reference to at least some of the items in the group of items, unless specifically stated otherwise. In the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A terminal of a telecommunications network, the terminal comprising:
   one or more processors;
   one or more antennas coupled to the one or more processors;
   a communications interface coupled to at least one of the one or more antennas and communicatively connectable with a relay terminal, the relay terminal connected to an application network device of an IP Multimedia Subsystem (IMS) network via an access network and defining at least a portion of a remote network;
   a spatial sensor configured to provide location information of the terminal; and
   a non-transitory computer-readable medium (CRM) coupled to the one or more processors, the CRM storing a computer-executable unit that, when executed by the one or more processors, performs associated acts, the unit including:
   a control unit coupled to the spatial sensor, the control unit configured to:
      determine the location information of the terminal, including a position of the terminal, using the spatial sensor of the terminal;
      establish a first connection using a sidelink connection with the relay terminal via the communications interface;
      determine status information of the terminal associated with the location information, the status information indicating the sidelink connection with the relay terminal and whether the position of the terminal is within an area of a 4G or 5G network and including at least one of:
         a current time at the terminal, or
         whether the terminal is within a range of a network base station; and
      transmit, via the communications interface, the status information to the application network device via the relay terminal, the status information used by the application network device for providing a real-time coverage map of the remote network.

2. The terminal according to claim 1, wherein the control unit is further configured to:
   receive, from the relay terminal via the communications interface, a handover message indicating an additional relay terminal different from the relay terminal; and
   in response, establish a second connection with the additional relay terminal via the communications interface.

3. The terminal according to claim 1, wherein the control unit is further configured to transmit the status information at least partly in response to at least one of: establishment of the first connection; receipt of a monitor request message; completion of a monitor request procedure; receipt of a discovery response message; expiration of a timer; data to be relayed via the first connection; preparation of a remote-terminal reporting message; receipt of a polling message; receipt of a scheduling message; or receipt of a query message.

4. The terminal according to claim 1, wherein the control unit is further configured to:
   measure a network parameter using the communications interface; and
   determine the status information indicating the network parameter.

5. The terminal according to claim 1, wherein:
   the control unit is further configured to:
      before transmitting the status information:
         store the status information in the CRM;
         terminate the first connection; and
         establish a second connection via the communications interface; and
      transmit the status information via the second connection.

6. The terminal according to claim 5, wherein:
   the second connection comprises a connection via at least one of:
      a wireless local-area-network connection between the terminal and an access point; or
      a cellular connection between the terminal and a base station.

7. The terminal according to claim 1, wherein the status information further indicates at least one of: a velocity of the terminal; a signal strength of the first connection at the terminal; a network-resource assignment; identification information of the terminal; identification information of an additional network, wherein the first connection is not carried via the additional network; a channel quality indicator (CQI) of the first connection; a Rank Indicator (RI) of the first connection; or a precoding matrix indicator (PMI) of the first connection.

8. The terminal according to claim 1 wherein the control unit is further configured to, before establishing the first connection, transmit a probe message requesting network service associated with a Group Communication System Enabler (GCSE) group.

9. A method, comprising, by a remote terminal of a telecommunications network:
   establishing a first connection using a sidelink connection with a relay terminal via a communications interface of the remote terminal, wherein the first connection is a sidelink connection, the relay terminal connected to an application network device of an IP Multimedia Subsystem (IMS) network via an access network and defining at least a portion of a remote network;
   determining location information of the remote terminal, including a position of the remote terminal, using a spatial sensor of the remote terminal;
   determining status information of the remote terminal associated with the location information, the status information indicating whether the position of the remote terminal is within an area of a 4G or 5G network and including at least one of:
      a current time at the remote terminal, or
      whether the remote terminal is within a range of a network base station; and
   transmitting, via the communications interface, the status information to the application network device via the relay terminal, the status information used by the application network device for providing a real-time coverage map of the remote network.

10. The method according to claim 9, further comprising:
    measuring a network parameter using the communications interface; and
    determining the status information indicating the network parameter.

11. The method according to claim 9, further comprising:
    before transmitting the status information, establishing a second connection via the communications interface; and
    transmitting the status information via the second connection, wherein the second connection comprises a connection via at least one of:
- a wireless local-area-network connection between the remote terminal and an access point; or
- a cellular connection between the remote terminal and the network base station.

12. The method according to claim 9, further comprising, before establishing the first connection, transmitting a probe message requesting network service associated with a Group Communication System Enabler (GCSE) group.

13. The method according to claim 9, wherein the status information indicates at least one of: a velocity of the remote terminal; a signal strength of the first connection at the remote terminal; a network-resource assignment; identification information of the remote terminal; identification information of an additional network, wherein the first connection is not carried via the additional network; a channel quality indicator (CQI) of the first connection; a Rank Indicator (RI) of the first connection; or a precoding matrix indicator (PMI) of the first connection.

14. A relay terminal of a telecommunications network, the relay terminal comprising:
- one or more processors;
- one or more antennas coupled to the one or more processors;
- a communications interface coupled to at least one of the one or more antennas and communicatively connectable with an application network device of an IP Multimedia Subsystem (IMS) network via an access network; and
- a non-transitory computer-readable medium (CRM) coupled to the one or more processors, the CRM storing a computer-executable unit that, when executed by the one or more processors, performs associated acts, the unit including:
- a control unit configured to:
  - receive, via the communications interface, from a remote terminal having a spatial sensor configured to provide location information of the remote terminal including a position of the terminal, status information of the remote terminal associated with the location information and a first connection using a sidelink connection between the relay terminal and the remote terminal, the status information indicating whether the remote terminal is within an area of a 4G network and whether a position of the remote terminal is within an area of a 5G network and including the location information of the remote terminal and at least one of:
    - a current time at the remote terminal, or
    - whether the remote terminal is within a range of a network base station;
  - transmit, via the communications interface, the status information to the application network device, the status information used by the application network device for providing a real-time coverage map of a remote network;
  - make a determination that a reliability of the first connection does not satisfy a predetermined criterion based at least in part on the status information; and
  - in response to the determination, cause the remote terminal to establish a connection with an additional relay terminal different from the relay terminal.

15. The relay terminal according to claim 14, wherein the control unit is further configured to:
- receive, from the remote terminal via the communications interface, second status information; and
- determine, based at least in part on the status information and the second status information, the reliability of the first connection.

16. The relay terminal according to claim 14, wherein the control unit is further configured to cause the remote terminal to establish the connection with the additional relay terminal at least partly by transmitting a handover message to the remote terminal via the communications interface.

17. The relay terminal according to claim 14, wherein the status information indicates at least one of: a velocity of the remote terminal; a signal strength of the first connection at the remote terminal; a network-resource assignment; identification information of the remote terminal; identification information of a second network, wherein the first connection is not carried via the second network; a channel quality indicator (CQI) of the first connection; a Rank Indicator (RI) of the first connection; or a precoding matrix indicator (PMI) of the first connection.

18. The relay terminal according to claim 15, wherein: the second status information indicates at least one of: a velocity of the remote terminal; a signal strength of the first connection at the remote terminal; a network-resource assignment; identification information of the remote terminal; identification information of a second network, wherein the first connection is not carried via the second network; a channel quality indicator (CQI) of the first connection; a Rank Indicator (RI) of the first connection; or a precoding matrix indicator (PMI) of the first connection.

\* \* \* \* \*